No. 860,897. PATENTED JULY 23, 1907.
G. G. & R. O. BLAKEY.
DEVICE FOR PREVENTING THE FLATTENING OF THE ENDS OF PIPE.
APPLICATION FILED JAN. 27, 1906.
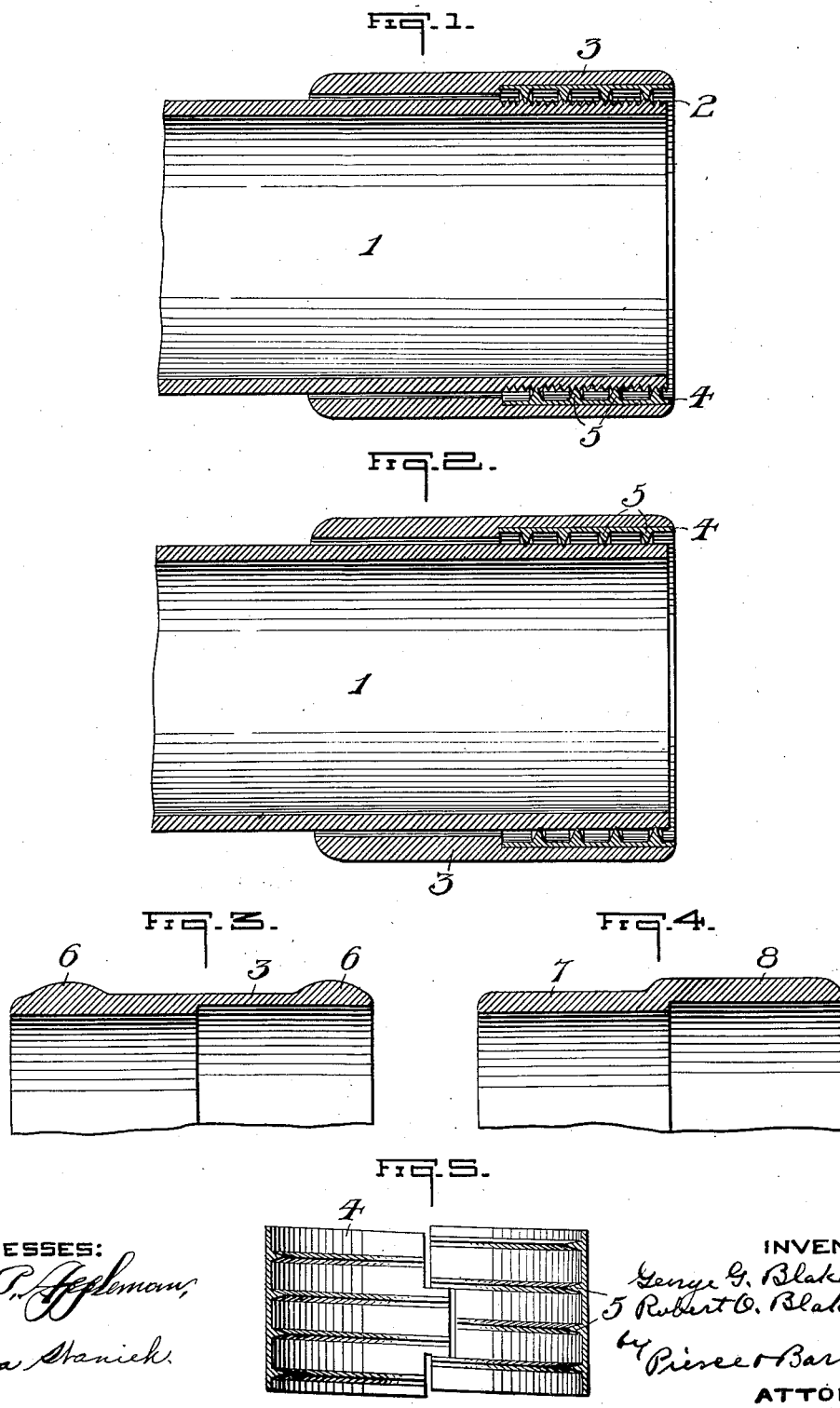

UNITED STATES PATENT OFFICE.

GEORGE G. BLAKEY AND ROBERT O. BLAKEY, OF PITTSBURG, PENNSYLVANIA.

DEVICE FOR PREVENTING THE FLATTENING OF THE ENDS OF PIPE.

No. 860,897.　　　　　Specification of Letters Patent.　　　Patented July 23, 1907.

Application filed January 27, 1906. Serial No. 298,111.

*To all whom it may concern:*

Be it known that we, GEORGE G. BLAKEY and ROBERT O. BLAKEY, citizens of the United States, both residing at Pittsburg, in the county of Allegheny and State of Pennsylvania, have invented or discovered new and useful Improvements in Devices for Preventing the Flattening of the Ends of Pipe, of which the following is a specification.

Our invention relates to devices for preventing the flattening of the ends of pipe, whether they are threaded or unthreaded and it is the object of our invention to extend the protection for a considerable distance from the ends of the pipe so that no flattening of the ends can occur so as to cause leaks after the pipes have been coupled together.

It is desirable with all kinds of pipe couplings that the ends of the pipe be kept exactly round, whether the couplings are screwed to the ends of the pipes or are slipped over the ends of the pipes and calked with lead or other material. In either case the flattening of the pipe distorts it so that the coupling does not fit as well and may entirely prevent the coupling being screwed on or slid over the pipe ends.

Referring to the drawings which accompany this specification and form a part of the same, Figure 1 is a longitudinal section showing our invention applied to a threaded pipe end; Fig. 2, a similar section showing the same applied to an unthreaded pipe; Figs. 3 and 4, fragmentary views showing in section the sleeve with reinforced portions; and Fig. 5, a section of the holding device for maintaining the sleeve on the pipe ends.

On the drawings, 1 represents a pipe having the threaded portion 2. 3 represents a sleeve encircling the end of the pipe and extending some distance beyond the threads 2. The outer end of the sleeve is made of somewhat larger internal diameter than the remainder of the sleeve and this larger portion contains therein a metallic ring or collar 4 provided with the ribs 5 which extend around the interior surface of the collar. This metal collar is preferably made of a piece of metal bent to circular form with the ends lying opposite each other as shown in Fig. 5. This piece of metal is bent laterally also so that the ribs at the meeting ends do not stand opposite each other but are arranged so as to form screw threads, whereby the collar may be screwed on the threads of the pipe as shown in Fig. 1, or upon the unthreaded end of the pipe as shown in Fig. 2. Where the pipe end is unthreaded the fit should be made tight enough to cause the ribs to bite slightly into the metal of the pipe. Preferably the sleeve 3 is heated so as to expand the same and the collar is then inserted within the same, the sleeve shrinking during the cooling so as to permanently connect together the sleeve and collar.

In Fig. 3 we have shown the sleeve provided with protecting ribs 6 on the exterior of the same which will stiffen it so as to prevent its breaking or bending. If preferred the sleeve may be exteriorly formed with off-set portions 7 and 8, whereby all portions of the sleeve will have substantially the same thickness. The number of the ribs 5 may be varied as in many cases a single rib would be sufficient, also the sleeve may be provided with ribs differently constructed from those shown but which would operate substantially upon the principles hereinbefore stated.

The function of the collar so far as our invention is concerned is merely to hold the sleeve in place and threads on the pipe ends are not essential to hold the collar, as the threads on the collar will bite into the pipe-ends sufficiently to hold it thereon.

Having described our invention, we claim—

In a device for preventing the flattening of pipe ends, a sleeve adapted to be removably placed on a pipe end and having sufficient thickness to prevent the indentation of the pipe end, the sleeve being interiorly enlarged from one end so as to form an annular recess, and a threaded collar adapted to be slid endwise into the said recess and secured therein.

Signed at Pittsburg, Pa., this 22nd day of January, 1906.

GEORGE G. BLAKEY.
　　　　　　　　　　　ROBERT O. BLAKEY.

Witnesses:
　F. N. BARBER,
　C. E. EGGERS.